Oct. 29, 1957     L. N. DENNIS     2,811,049
OVERDRIVE ATTACHMENT FOR VEHICLE POWER TRANSMISSIONS
Filed June 13, 1955
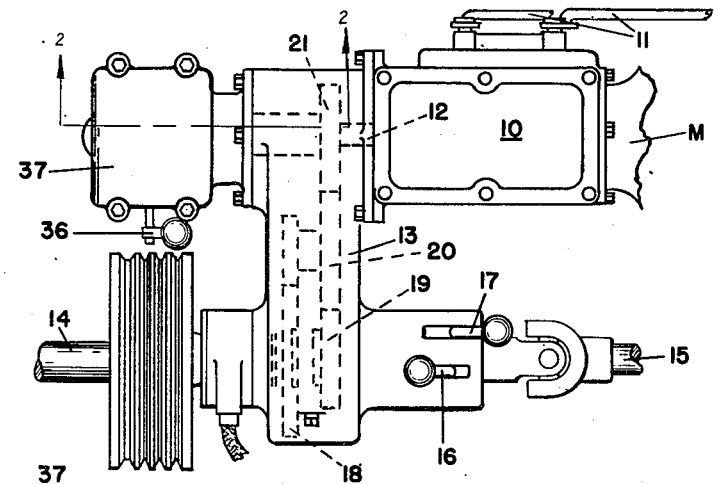
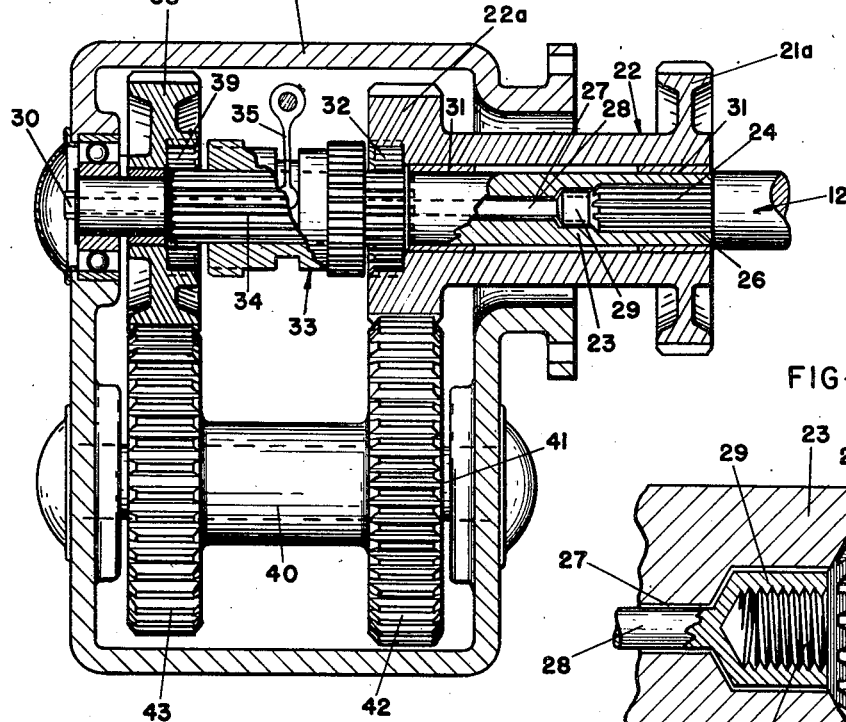
INVENTOR.
Lloyd N. Dennis

United States Patent Office 2,811,049
Patented Oct. 29, 1957

2,811,049

OVERDRIVE ATTACHMENT FOR VEHICLE POWER TRANSMISSIONS

Lloyd N. Dennis, Walla Walla, Wash.

Application June 13, 1955, Serial No. 515,036

3 Claims. (Cl. 74—370)

This invention is an overdrive attachment for vehicle power transmissions which is particularly adapted for application to existing transmissions.

One object of the invention lies in the provision of an overdrive attachment for vehicles of the four wheel drive type, which include not only the conventional transmission, but also a transfer case to provide means for driving the front wheel axle as well as the rear wheel axle, and which admits of attachment thereto with an expenditure of very little time.

Another object of the invention lies in the provision of an overdrive attachment for a vehicle power transmission which includes a novel means of uniting a shaft extension with the main transmission shaft existing in the power transmissions.

Other objects and advantages of the invention will become apparent during a study of the following specification in conjunction with the accompanying drawings, wherein like numerals are employed to designate like parts.

In the drawings I have shown for the purpose of illustration and not for limitation, one physical embodiment of my present invention and it should be understood that I desire that the invention shall be limited only by the disclosures constituting the prior art and the express limitations recited in the appended claims. In the drawings:

Figure 1 is a fragmentary plan view of a power transmission including the overdrive attachment constituting the subject matter of the present invention;

Figure 2 is a vertical cross section upon an enlarged scale showing the overdrive attachment and taken substantially on the plane indicated by line 2—2 of Figure 1; and Figure 3 is an enlarged fragmentary view partially in cross section and showing the means of attaching the main shaft extension to the main shaft.

Referring now more particularly to the drawing, I have disclosed in Figure 1, the power transmission of the well known "Willys Jeep" having the four wheel drive. The conventional transmission is indicated in general by the numeral 10, and as seen, is shown to be adapted for operation by a remote control gear shift by means of the rods 11. The transmission main shaft 12 extends rearwardly from the transmission 10 and into the transfer case 13 which includes the mechanism necessary to impart rotary motion to a rearwardly extending propeller shaft 14 and a forwardly extending propeller shaft 15, which are respectively adapted for driving the rear and front wheels of the vehicle.

The front wheel drive shift lever 16 is shown to be mounted on the transfer case 13, and the under drive shift lever 17 is also shown to be mounted thereon. In actual operation, the front wheel drive shift lever 16 is adapted to shift a clutch gear (not shown) into and out of engagement with the output shaft (not shown) contained within the transfer case to engage and disengage the propeller shaft 15 selectively.

The under drive shift lever 17 is adapted to shift the output shaft sliding gear 18 into and out of locking engagement with output shaft gear 19, thus selectively changing the gear ratio between the transmission main shaft 12 and the propeller shafts 15 and 14 through the intermediate gear 20. In conventional construction, the transfer case 13 contains a main drive gear at 21 which meshes with the intermediate gear 20 as seen by the broken lines in Figure 1. However, in the present application, to apply the overdrive to the four wheel drive transfer case transmission, I remove the conventional main drive gear 21 and instead apply a modified main drive gear as seen at 21a in Figure 2, which is seen to be part of a cluster gear 22 which includes space from the main drive gear 21a a driven gear 22a.

To support the cluster gear 22 and other mechanism, I provide a main shaft extension 23 which is fixed in axial alignment to the transmission main shaft 12. As seen in Figures 2 and 3, the transmission main shaft 12 is provided at its outer end with a reduced externally splined portion 24, and on its end is provided with a boss or externally threaded male extension 25 axially disposed.

The main shaft extension 23 is provided with an axial internally splined bore 26 at one end thereof, and complementary in form to slidingly receive the splined portion 24 of the transmission main shaft 12. The extension is further provided with a reduced axial bore 27 which communicates the internally splined bore 26 with the opposed end of the main shaft extension 23. A bolt 28 extends through the bore 27 and is provided with an enlarged portion which is internally bored and threaded to form a female member 29, which is adapted to cooperate with the externally threaded male extension 25 and releasably unite the main shaft 12 and the main shaft extension 23.

At its opposed end, the bolt 28 is provided with a nut or other releasable head 30, thus adapting the bolt to be rotated by means of a tool and thereby selectively engage and disengage the female member 29 and the male extension 25.

The cluster gear 22 is seen to be carried by bushings 31, encircling the main shaft extension 23, and journalling the cluster gear 22 for rotation thereon. It will be seen that the driven gear 22a is provided with a clutch member 32 which is here seen to be an internal spline and which is adapted to cooperate with a sliding clutch element 33 fixed to the main shaft extension 23 for rotation therewith and slidable thereon by means of splines 34. The sliding clutch element 33 is therefore adapted to engage and disengage with the clutch member 32 of the cluster gear 22 with the driven gear 22a.

A conventional shift fork 35 is operated by means of an overdrive shift lever 36. At its end opposed to the transmission main shaft 12, the main shaft extension 23 is journalled in the overdrive attachment case 37 and also carries an idler gear 38, which is free to rotate thereon. The sliding clutch 33 is provided with engaging means at its opposed end, and this means is adapted to cooperate with the clutch member 39 forming a part of the idler gear 38.

An idling gear assembly 40 is carried by a countershaft 41, and as seen in Figure 2, is provided with two spaced gears 42 and 43. The gear 43 is continuously in mesh with the idler gear 38, and the gear 42 is continuously in mesh with the driven gear 22a. Obviously, the countershaft 41 is supported in the case 37, and the shaft may be journalled in the case or the gear assembly 40 may be journalled on the shaft, whichever is found convenient.

In operation, it will be seen that the transmission main shaft 12 is driven (through the conventional shifting transmission 10) from the motor M, and this rotary motion is imparted to the main shaft extension 23. When it is desired that the main drive gear 21a be driven at a ratio of 1 to 1 with respect to the transmission main shaft 12, the sliding clutch element 33 is shifted rightwardly as viewed in Figure 2, so that it engages with clutch member 32 and thereby rigidly locks the cluster gear 22 to the main shaft extension 23 and thus rotates the main drive gear 21a. But when it is desired to increase the ratio of rotation of the main drive gear 21a with respect to the transmission main shaft 12, the sliding clutch element 33 is shifted leftwardly as viewed in Figure 2, and engages the clutch member 39, thus rotating idler gear 38, which in turn rotates the gear assembly 40 and this being in mesh with the driven gear 22a, rotates the cluster gear 22.

Obviously, the ratio between the shaft 12 and the cluster gear 22 will be dependent upon the ratios present in the gear assembly, the idler gear 38, and driven gear 22a. In actual practice, I provide a ratio of 4 to 5, that is, to each four revolutions of the transmission main shaft I impart five revolutions to the main drive gear 21a. I find this ratio very satisfactory, since it permits not only an overdrive in high gear, but also permits greater variations in the low gears by providing a ratio intermediate each of the conventional gear ratios present in the four wheel drive power transmission.

Having thus described my invention, I claim:

1. An overdrive attachment for a vehicle power transmission including a transmission main shaft having its free end portion splined and terminating in a reduced threaded boss comprising: a case adapted to be releasably secured in position to encircle at least the end of said main shaft; a main shaft extension journalled at one end in said housing and fixed to said main shaft in axial alignment; a cluster gear including a main drive gear and a driven gear fixed against longitudinal movement and rotatable about said main shaft extension; a clutch member fixed relative to said cluster gear; a sliding clutch element rotatably fixed on said shaft extension and selectively movable into and out of engagement with said cluster gear; and an idler gear assembly journalled for rotation in said case with one gear in mesh with said driven gear; and said clutch element having means for rotating said gear assembly when said clutch element is out of engagement with said cluster gear, there being a ratio differential between said transmission main shaft and said cluster gear when said clutch element is engaged with said clutch member as opposed to when said gear assembly is rotated by said clutch element.

2. The invention as defined in claim 1 wherein the means fixing said main shaft extension to said main shaft comprises said main shaft extension having at one end an internally splined bore complementary in form to the splines of said main shaft, and a reduced bore communicating said splined bore with the opposed end of said shaft; a bolt loosely extending through said second named bore and having an internally threaded female member on its inner end disposed in said splined bore and adapted to cooperate with a threaded extension on said main shaft, and a nut on the opposed end of said bolt for rotating said bolt to thread said female member onto and off of said extension.

3. In a power transmission having a main shaft and a main shaft extension, means for uniting said shafts in axial alignment comprising external splines on one end of said main shaft; a reduced externally threaded male extension on the end of said shaft; and an internally splined bore in the end portion of said shaft extension and slidingly receiving the splines of said main shaft; said shaft extension having a reduced axial bore communicating said splined bore with the opposed end of said shaft; a bolt loosely extending through said second named bore and having an internally threaded female member communicating with said internally splined bore and threadedly receiving said male extension; and means on the opposed end of said bolt for manually rotating said female member for threadedly engaging and disengaging said element and extension.

References Cited in the file of this patent

UNITED STATES PATENTS

| | | |
|---|---|---|
| 1,099,520 | Spacke et al. | June 9, 1914 |
| 1,849,101 | Livergood | Mar. 15, 1932 |